United States Patent [19]

Phillipps

[11] Patent Number: 4,708,161
[45] Date of Patent: Nov. 24, 1987

[54] PLUG VALVE

[75] Inventor: Malcolm W. Phillipps, Stirling, Australia

[73] Assignee: Philmac Pty Limited, Plympton, Australia

[21] Appl. No.: 913,981

[22] Filed: Oct. 1, 1986

[30] Foreign Application Priority Data

Oct. 3, 1985 [AU] Australia .............................. PH2738

[51] Int. Cl.$^4$ .......................... F16L 7/00; F16K 25/00
[52] U.S. Cl. .................................... 137/375; 251/175; 251/192
[58] Field of Search ............... 251/175, 192, 308, 314; 137/375

[56] References Cited

U.S. PATENT DOCUMENTS

| 560,994 | 5/1896 | Heston ................................. 251/192 |
| 2,539,106 | 1/1951 | Shenck ................................ 251/312 |
| 2,606,737 | 8/1952 | Tratzik ................................ 251/175 |
| 3,330,296 | 7/1967 | Temple ................................ 251/312 |
| 3,735,957 | 5/1973 | Puggar, Jr. .......................... 251/312 |
| 4,510,966 | 4/1985 | Parsons, Jr. ......................... 251/312 |

FOREIGN PATENT DOCUMENTS 1057841 5/1959 Fed. Rep. of Germany ...... 251/312

OTHER PUBLICATIONS

CRC Handbook of Chemistry and Physics (Chemical Rubber Co., Cleveland, Ohio, 50th ed.), p. C–769, 5/1979.
Specification for Underground Plug Cocks for Cold Water Services (BSI 5/1979).

Primary Examiner—A. Michael Chambers
Attorney, Agent, or Firm—Brown, Martin, Haller & Meador

[57] ABSTRACT

A tapered plug valve containing a tapered plug surrounded by a sleeve of elastomeric material which deflects upon high fluid pressure applied through the valve inlet port, leakage which might otherwise occur due to such deflection being absorbed by 'O' ring seals. The plug may also be urged into the valve body by hydraulic pressure from the inlet port, and this maintains a sealing contact between the elastomeric material and the valve body surrounding the ports.

7 Claims, 5 Drawing Figures

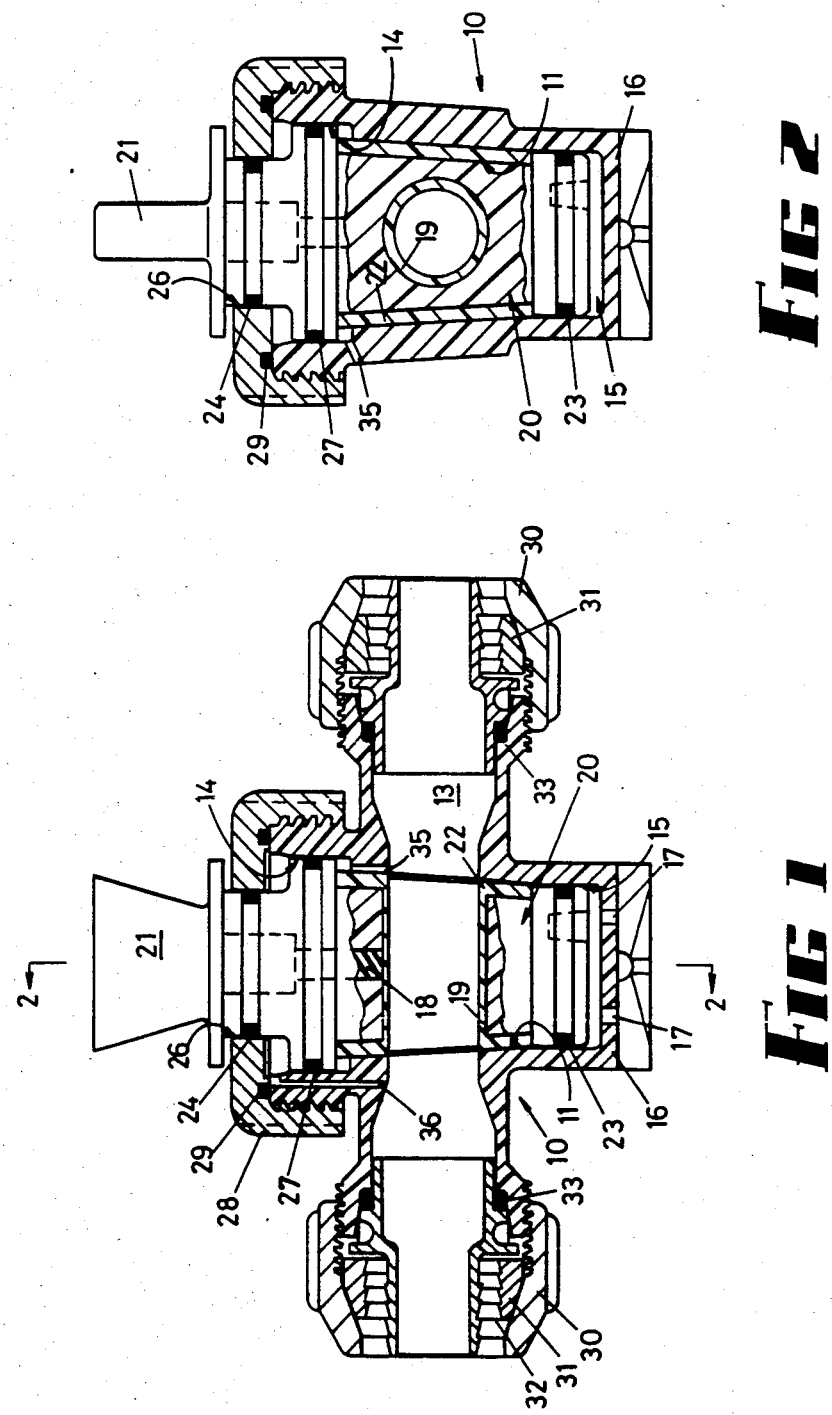

PLUG VALVE

This invention relates to a valve of a type wherein a tapered plug is movable within a similarly tapered socket between an off and an on position.

BACKGROUND OF THE INVENTION

Plug valves are very well known and are in common use, but are subject to a number of disabilities. Firstly, the shape of the plug within the socket is likely to vary with time, and accordingly leakage can take place. Secondly, if the plugs are inserted with sufficient interference into the respective sockets to minimise leakage, they tend to become difficult to rotate. Thirdly, quite frequently the plugs are retained by means of nuts or other threaded members which project through the small diameter end of the body, and this renders removal of the plug difficult if there is no access provided for the underside of the body.

BRIEF SUMMARY OF THE INVENTION

In an embodiment of this invention, a tapered plug of a plug valve is surrounded by a sleeve of elastomeric material which deflects upon high fluid pressure applied through the valve inlet port, leakage which might otherwise occur due to such deflection being absorbed by 'O' ring seals. The plug may also be urged into the valve body by hydraulic pressure from the inlet port, and this maintains a sealing contact between the elastomeric material and the valve body surrounding the ports.

More specifically, in one embodiment of this invention, a plug valve comprises a body and cap assembly, the body having a tapered wall therein defining a plug socket, and respective port surfaces defining circumferentially spaced inlet and outlet ports opening into said plug socket, a tapered plug contained within the plug socket and having a fluid flow passage extending therethrough, an elastomeric sleeve surrounding portion of the plug, said cap being a retaining cap releasably engaging the body and retaining the plug within its plug socket, and at least one 'O' ring seal between the plug and the body and cap assembly.

If a resilient sleeve surrounds the plug, then very high pressure imparted against the plug from the inlet end of the valve can cause lateral movement of the plug within the socket, and although the outlet aperture is sealed by the resilient sleeve, there can nevertheless be "back leakage" and to accommodate this problem in a further embodiment of the invention at least one of the body, the retaining cap or the plug upper end is provided with an 'O' ring (or other seal) such that the 'O' ring will retain the plug in sealable engagement with the body and retaining cap even if the plug is minutely displaced laterally by a short distance.

Because of the tapered cross sectional shape of the plug, there is a tendency for hydraulic pressure from the inlet end to lift the plug away from the socket walls so that leakage can occur. In a further embodiment of this invention, the body comprises a bleed aperture from the inlet end into the space between the plug and its retaining cap, so that there is a differential pressure urging the plug into the socket which will retain the plug against outward displacement.

BRIEF DESCRIPTION OF THE DRAWINGS

Two embodiments of the invention are described hereunder in some detail, with reference to, and are illustrated in, the accompanying drawings, in which FIG. 1 is an elevational section through a plug valve, according to a first embodiment, FIG. 2 is a central cross section through same, taken on line 2—2 of FIG. 1.

DETAILED DESCRIPTION OF THE PREFERRED EMBODIMENTS

Figure 4:
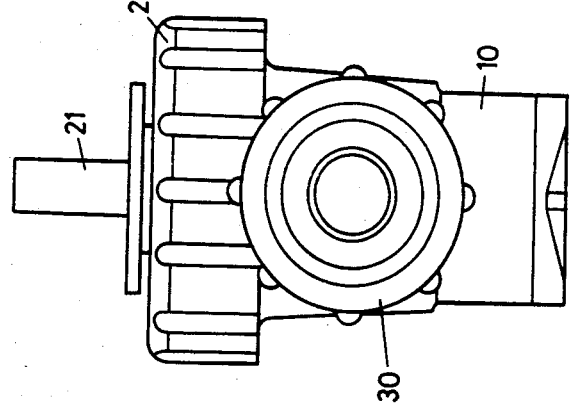
FIG. 4 is an end elevation of FIG. 3.

Referring first to the embodiment of FIGS. 1 and 2, a valve body 10 contains a tapered wall defining a tapered plug socket 11, and inlet and outlet ports 12 and 13 extend from diametrically opposite sides of the socket wall. The outlet end of the tapered wall is provided with a parallel surface 14 and the lower end also with a parallel surface 15 but of smaller diameter. Below the socket wall there is a discoid end 16 but this is provided with drain apertures 17.

Figure 3:
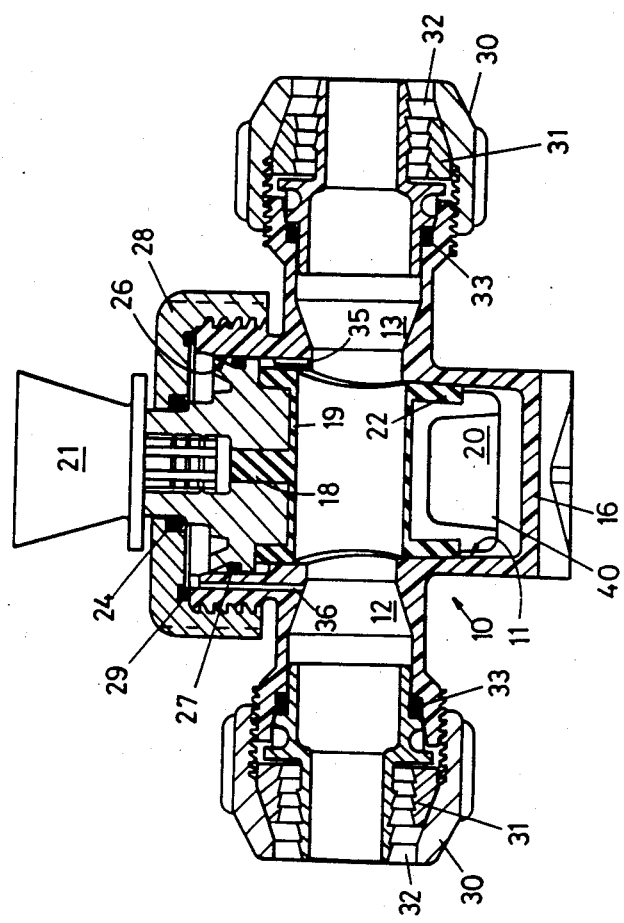
FIG. 3 is an elevational section according to a second embodiment.

A tapered plug 20 is rotatable within the plug socket 11, the plug 20 having an outwardly extending key 21 by which it can be rotated, and being formed from rigid moulded material (for example acetal). The key 21 connects to plug 20 by a spigot-and-socket latching connection, as best seen in FIG. 3. The plug 20 has a sleeve 22 of elastomeric material (for example polyurethane) moulded thereon. The sleeve 22 of polyurethane is in sealable engagement with the tapered surface of the plug socket 11 in the body 10. The polyurethane is injected through a central injection aperture 18 and forms a lining 19 of plug 20, some of the polyurethane remaining in the aperture. All the polyurethane is a single monolithic mass.

The lower end of the plug 20 is provided with a resilient 'O' ring 23 which slidably engages the lower parallel surface 15 below the socket, while the upper end is provided with a second resilient 'O' ring 24 which slidably engages a parallel surface 26 in a retention cap 28, the retention cap threadably engaging the body to form said body and cap assembly. Intermediate their ends there is provided a third resilient 'O' ring 27 which slidably engages the parallel surface 14 above the socket 11. A fourth 'O' ring 29 seals the cap 28 to the body 10.

Since it is possible that the plug valve may be required to be used with pipes which may vary in size, the retaining nuts 30 contain within them respective compression rings 31, these compression rings 31 having respective outwardly tapered surfaces which engage complementary tapered surfaces in respective nuts 30, and containing barbs 32 which engage over the outer surface of a pipe to be secured to the valve. A sealing 'O' ring 33 is used in each instance between an inner wall of the body 10 and the insert 34.

As shown, there is a relief hole 35 which is located below the intermediate 'O' ring 27 near outlet port 13, and there is located a high pressure inlet hole 36 which extends from the inlet port 12 to the space between the 'O' rings 24 and 27.

The arrangement is such that the elastomer surrounding the tapered portion of the plug deforms slightly in a lateral direction upon the application of high pressure to the plug, but this deformation is accommodated by the resilience of the 'O' rings 23, 24 and 27, and in practice it is an easy matter to produce a valve which does not leak even under very high pressure. However high pressure also imparts a downwards thrust on the plug 20 due to ingress of water into the space between the 'O' rings 24 and 27, and this is effective in maintaining sealing contact between the resilient elastomeric sleeve and the plug socket walls. The relief hole 35 allows any liquid which may be trapped below that 'O' ring to be discharged readily into the outlet port 13.

The second embodiment of FIGS. 3 and 4 is generally similar to the first, and similar designations identify similar elements. However, in FIG. 3 there is no inner 'O' ring 23, and the underside of plug 20 comprises a skirt 40 which forms an air entrapment space, and avoids the need for drain apertures 17. 'O' ring 24 is arranged slightly differently from the first embodiment. FIG. 3 also clearly identifies the spigot-and-socket connection between the plug 20 and its key 21.

Figure 5:
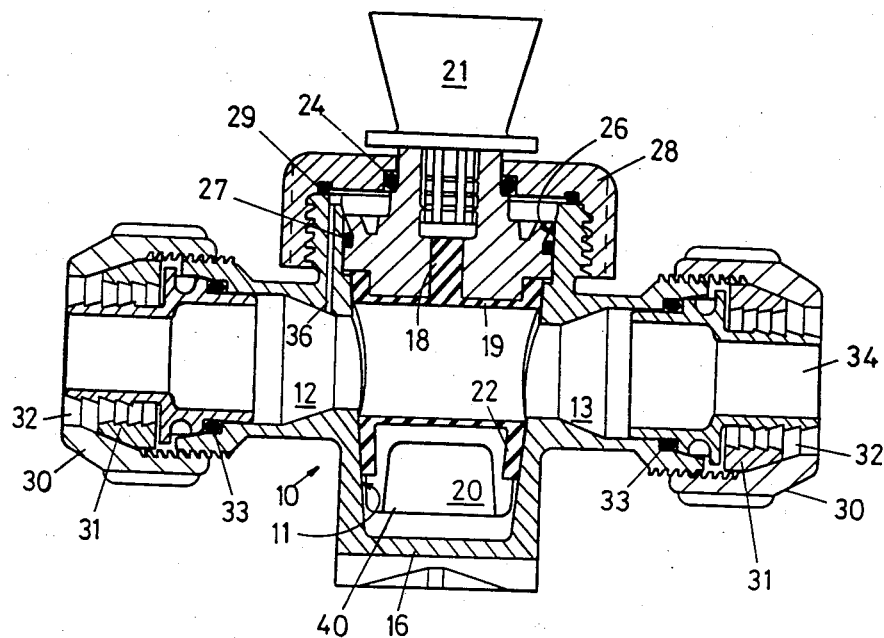
FIG. 5 is an elevational section similar to FIG. 3, but illustrating a construction without a relief hole (35).

FIG. 5 shows a further variation, wherein the cone angle of the plug 20 is slightly greater than in FIG. 3, and this enables so much reduction in the clearance space below 'O' ring 27 that the necessity for the pressure relief hole is removed.

I claim:

1. A plug valve comprising a body and cap assembly, the body having a tapered wall therein defining a plug socket, and respective port surfaces defining circumferentially spaced inlet and outlet ports opening into said plug socket,
    a tapered plug contained within the plug socket and having a fluid flow passage extending therethrough, an elastomeric sleeve surrounding portion of the plug,
    said cap being a retaining cap releasably engaging the body and retaining the plug within its plug socket, and
    at least one 'O' ring seal between the plug and the body and cap assembly,
    said body comprising a parallel wall extending from the outer end of said tapered wall, said plug comprising a circumferential groove containing an 'O' ring seal which sealably and slidably engages said parallel wall,
    said body further comprising a bleed aperture extending from said inlet port to a space between the plug and cap, such that fluid pressure, when at the inlet port, urges the plug into said socket.

2. A plug valve according to claim 1 wherein said cap contains a circumferential groove containing an 'O' ring seal which sealably and slidably engages a surface of said plug.

3. A plug valve according to claim 1 wherein said plug contains a further circumferential groove containing an 'O' ring seal which sealably and slidably engages a surface of said cap.

4. A plug valve according to claim 3 wherein said plug contains a still further groove near its inner end which sealably and slidably engages a surface of said body near its inner end, and said body inner end contains at least one drain aperture.

5. A plug valve according to claim 1 wherein said elastomeric sleeve is monolithic with an elastomeric lining defining said fluid flow passage through said plug.

6. A plug valve according to claim 5 wherein said plug comprises a central injection aperture at least partly containing elastomeric material of said sleeve and lining.

7. A plug valve according to claim 1 further comprising a key extending outwardly from the plug and secured thereto with a latching spigot-and-socket connection.

* * * * *